US012305869B2

(12) United States Patent
Sakaguchi et al.

(10) Patent No.: US 12,305,869 B2
(45) Date of Patent: May 20, 2025

(54) APPARATUS MANAGEMENT DEVICE AND SOFTWARE GENERATION METHOD

(71) Applicant: Mitsubishi Electric Corporation, Tokyo (JP)

(72) Inventors: Hiroaki Sakaguchi, Tokyo (JP); Tetsushi Masuno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 694 days.

(21) Appl. No.: 17/627,999

(22) PCT Filed: Sep. 27, 2019

(86) PCT No.: PCT/JP2019/038270
§ 371 (c)(1),
(2) Date: Jan. 18, 2022

(87) PCT Pub. No.: WO2021/059504
PCT Pub. Date: Apr. 1, 2021

(65) Prior Publication Data
US 2022/0268473 A1 Aug. 25, 2022

(51) Int. Cl.
*G06F 3/00* (2006.01)
*F24F 1/00* (2019.01)
*F24F 11/00* (2018.01)
*F24F 11/49* (2018.01)
*F24F 11/56* (2018.01)
*G06F 8/65* (2018.01)
(Continued)

(52) U.S. Cl.
CPC .............. *F24F 11/49* (2018.01); *F24F 11/56* (2018.01); *G06F 8/65* (2013.01)

(58) Field of Classification Search
CPC ... G06F 8/35; G06F 13/00; G06F 8/65; G06F 3/048; F24F 11/49; F24F 11/56;
(Continued)

(56) References Cited

U.S. PATENT DOCUMENTS 8,311,490 B2 * 11/2012 Witkowski ............. G05B 11/01
455/70
9,599,382 B2 * 3/2017 Higaki ..................... F24F 11/63
(Continued)

FOREIGN PATENT DOCUMENTS

JP    H07-85166 A    3/1995
JP    2002-51386 A   2/2002
(Continued)

OTHER PUBLICATIONS

International Search Report of the International Searching Authority mailed Dec. 17, 2019 for the corresponding International Patent Application No. PCT/JP2019/038270 (and English translation).
(Continued)

*Primary Examiner* — Thuy Dao
(74) *Attorney, Agent, or Firm* — Posz Law Group, PLC

(57) ABSTRACT

An apparatus base model is a model for defining apparatuses in an air conditioner management system from apparatus data that includes information regarding each item managed for the apparatuses. An SW generation unit is configured so as to associate the apparatus data with the apparatus base model on the basis of the apparatus data and thereby generate apparatus control SW for managing the apparatuses in the air conditioner management system.

9 Claims, 11 Drawing Sheets

(51) Int. Cl.
*G06F 9/445* (2018.01)
*G06F 9/455* (2018.01)

(58) Field of Classification Search
CPC .......... G05B 19/414; H04N 21/44224; H04N 21/42204; B62D 5/049; B62D 5/0484; G01D 3/0365; B60W 50/0205; B60W 40/09; G01L 25/003; G01L 5/221; A61B 34/73; A61B 18/12; A61B 18/1492; A61B 17/1114
See application file for complete search history.

(56) References Cited

U.S. PATENT DOCUMENTS

| | | | |
|---|---|---|---|
| 2003/0080874 A1 | 5/2003 | Yumoto et al. | |
| 2018/0142910 A1* | 5/2018 | Hwang | F24F 11/61 |
| 2020/0192352 A1* | 6/2020 | Rastoll | G06V 20/58 |

FOREIGN PATENT DOCUMENTS

| | | |
|---|---|---|
| JP | 2003-143670 A | 5/2003 |
| JP | 2005-107737 A | 4/2005 |
| JP | 2008-17025 A | 1/2008 |
| JP | 2015-079528 A | 4/2015 |
| JP | 2017-111691 A | 6/2017 |

OTHER PUBLICATIONS

Office Action dated Jul. 3, 2024 issued in corresponding Chinese Patent Application No. 201980100303.1 (and English translation).

Office Action dated Nov. 22, 2022 issued in the corresponding Japanese Patent Application No. 2021-548279 (and English translation).

* cited by examiner

APPARATUS MANAGEMENT DEVICE AND SOFTWARE GENERATION METHOD

CROSS REFERENCE TO RELATED APPLICATION

This application is a U.S. national stage application of International Patent Application No. PCT/JP2019/038270 filed on Sep. 27, 2019, the disclosure of which is incorporated herein by reference.

TECHNICAL FIELD

The present disclosure relates to an apparatus management device that remotely manages at least one apparatus, and a software generation method for generating software for managing an apparatus by the apparatus management device.

BACKGROUND ART

An apparatus management device that enables remote management of apparatuses such as an air conditioner and a lighting apparatus is known. According to such an apparatus management device, it is possible to monitor and operate apparatuses such as an air conditioner and a lighting apparatus together. It is desirable that such an apparatus management device can easily handle an addition of a new apparatus or a change in model.

For example, Japanese Patent Laying-Open No. 2002-51386 (Patent Literature 1) discloses an apparatus controller which is intended for a video system and with which it is easy to add or change an apparatus in the video system. In this controller, when an apparatus is added or changed, control contents of the controller can be changed by rewriting data without changing software (internal program) of the controller (see Patent Literature 1).

CITATION LIST

Patent Literature

PTL 1: Japanese Patent Laying-Open No. 2002-51386

SUMMARY OF INVENTION

Technical Problem

The apparatus controller disclosed in Japanese Patent Laying-Open No. 2002-51386 is useful in that the control content of the controller can be changed only by rewriting data, but there is a possibility that the apparatus controller cannot sufficiently handle an addition or change of an apparatus only by rewriting data. In order to be able to sufficiently handle the addition of an apparatus, and the like, when, for example, an apparatus is added, an apparatus management device such as the controller described above still needs to be newly installed with software capable of managing the added apparatus.

However, sending a worker to a site where the apparatus management device is installed to change software of the apparatus management device every time an apparatus to be managed by the apparatus management device is added or changed is costly and time-consuming.

The present disclosure has been accomplished to solve the above problems, and an object of the present disclosure is to provide an apparatus management device capable of flexibly and easily handling addition or change of an apparatus.

Another object of the present disclosure is to provide a software generation method for automatically generating software for managing an apparatus in an apparatus management device capable of flexibly and easily handling addition or change of an apparatus.

Solution to Problem

An apparatus management device according to the present disclosure is an apparatus management device that remotely manages at least one apparatus and includes a storage device to store an apparatus base model and an SW (Software) generation unit to generate software for managing the apparatus by the apparatus management device. The apparatus base model is a model for defining the apparatus in the apparatus management device from apparatus data including information regarding each item managed for the apparatus. The SW generation unit is configured to generate software for managing the apparatus by the apparatus management device by associating the apparatus data with the apparatus base model on the basis of the apparatus data.

In addition, a software generation method according to the present disclosure is a software generation method for automatically generating, in an apparatus management device that remotely manages at least one apparatus, software for managing the apparatus, and includes: acquiring, by the apparatus management device, apparatus data including information regarding each item managed for the apparatus; and generating, in the apparatus management device, the software by associating the apparatus data with an apparatus base model on the basis of the apparatus data. The apparatus base model is a model for defining the apparatus in the apparatus management device from the apparatus data.

Advantageous Effects of Invention

According to the apparatus management device and the software generation method, the apparatus base model for defining the apparatus in the apparatus management device is prepared from the apparatus data, and the apparatus data is associated with the apparatus base model, by which software for managing the apparatus by the apparatus management device is automatically generated. Therefore, according to the apparatus management device and the software generation method, there is no need to change the software of the apparatus management device by a worker when an apparatus is added or changed, and it is possible to flexibly and easily handle the addition or change of the apparatus.

DESCRIPTION OF EMBODIMENTS

Figure 1:
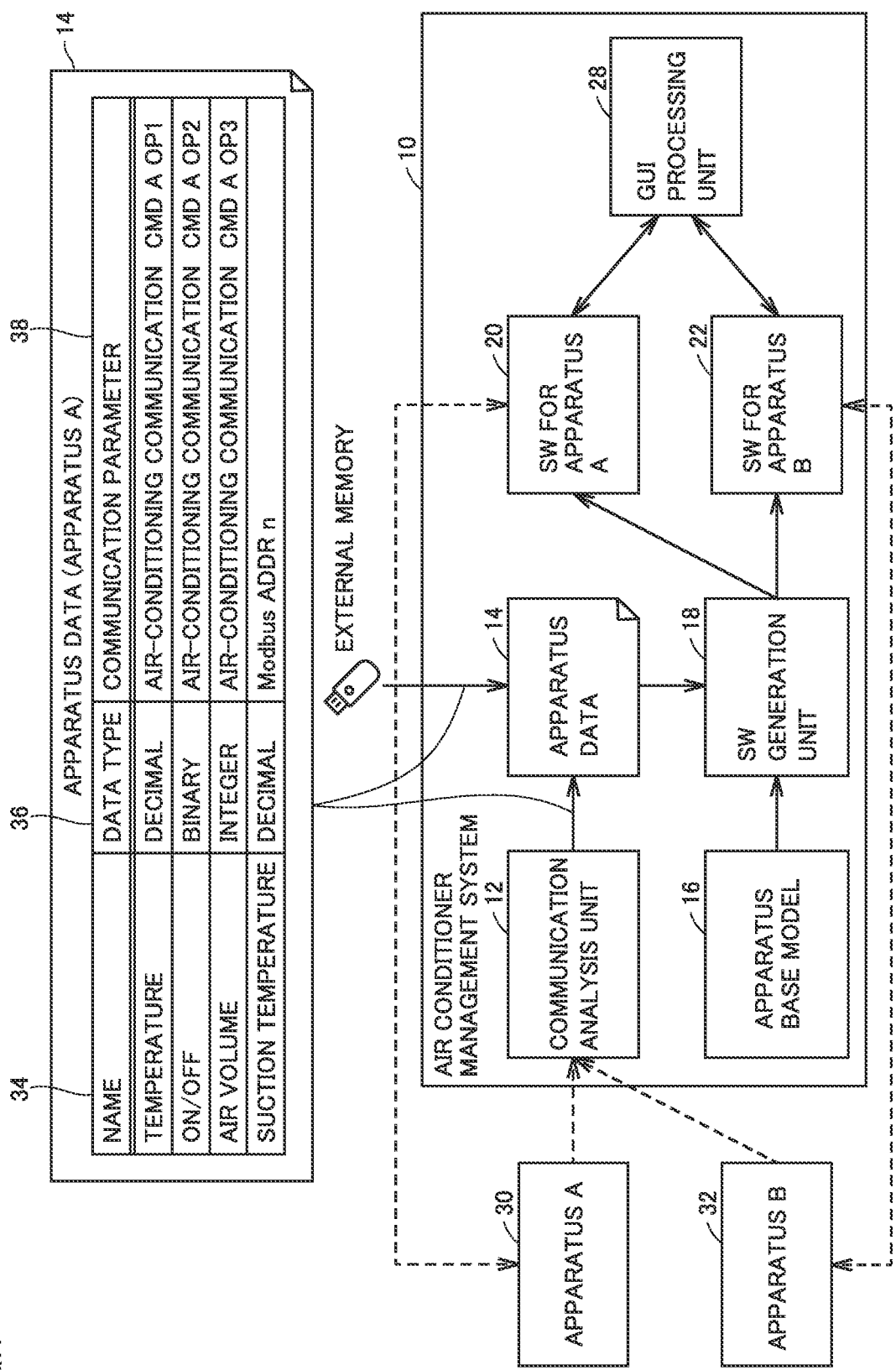
FIG. 1 is an overall configuration diagram of an air conditioner management system which is an example of an apparatus management device according to an embodiment of the present disclosure.

An embodiment of the present disclosure will now be described in detail with reference to the drawings. In the drawings, the same or corresponding parts are denoted by the same reference numerals, and the description thereof will not be repeated.

FIG. 1 is an overall configuration diagram of an air conditioner management system which is an example of an apparatus management device according to an embodiment of the present disclosure. An apparatus managed by the air conditioner management system is typically an air conditioner, but an apparatus other than the air conditioner can also be managed. For example, a lighting apparatus and the like can also be managed.

Referring to FIG. 1, air conditioner management system 10 includes a communication analysis unit 12, an apparatus base model 16, a software (SW) generation unit 18, apparatus control SW 20 and 22, and a graphical user interface (GUI) processing unit 28.

An apparatus 30 (apparatus A) and an apparatus 32 (apparatus B) are apparatuses managed by air conditioner management system 10, and are, for example, air conditioners or lighting devices having functions such as dimming and toning. Air conditioner management system 10 can monitor apparatuses 30 and 32 and air conditioner management system 10 can operate or control apparatuses 30 and 32. Although, in this example, two apparatuses 30 and 32 are managed by air conditioner management system 10, the number of apparatuses is not limited thereto, and one or more than three apparatuses may be managed.

Communication analysis unit 12 receives and analyzes communication data transmitted from an apparatus connected to air conditioner management system 10. Specifically, communication analysis unit 12 acquires apparatus data 14 including information regarding the connected apparatus (hereinafter referred to as "target apparatus") from the received communication data, and outputs acquired apparatus data 14 to SW generation unit 18. Note that air conditioner management system 10 and apparatuses 30 and 32 may be connected by wire or wirelessly.

Apparatus data 14 indicates data including information regarding each item of the target apparatus to be managed. For example, when the target apparatus is an air conditioner, apparatus data 14 includes information such as a data type and a communication parameter for each item such as a temperature, ON/OFF indicating whether the air conditioner is operated or stopped, an air volume, and a suction temperature.

The data type indicates, for example, whether control data (data itself to be monitored, operated, or controlled) of the target apparatus is decimal data, binary data, or integer data. The communication parameter is a parameter instructing acquisition of the control data from the target apparatus in accordance with a designated communication command using a designated communication scheme. For example, the communication parameter "air-conditioning communication CMD A OP1" for the item having a name of "temperature" indicates that the data of "temperature" is acquired from the target apparatus by an operand OP1 of a command A using a prescribed air-conditioning communication protocol. Apparatus data 14 is not control data itself of each item such as temperature, ON/OFF, air volume, and suction temperature, but is a parameter for defining the target apparatus in air conditioner management system 10 using an apparatus base model 16 to be described later.

Although apparatus data 14 is acquired from the target apparatus by the communication data in the above example, it may be acquired from an external memory such as a USB memory or an SD card instead of using communication. When apparatus data 14 is acquired from the external memory, acquired apparatus data 14 is provided to SW generation unit 18.

Apparatus base model 16 is a model for defining the target apparatus in air conditioner management system 10 on the basis of acquired apparatus data 14. Apparatus base model 16 is a general-purpose model rather than a specific model indicating a specific apparatus, and the target apparatus is defined (embodied) in air conditioner management system 10 by associating apparatus data 14 including information regarding the target apparatus with apparatus base model 16.

Apparatus base model 16 includes a model (first model) that defines a data type (integer, decimal, binary, etc.) of control data to be managed in air conditioner management system 10 and a model (second model) that defines a communication scheme (prescribed air-conditioning communication protocol, Modbus protocol, etc.) for communicating the control data with the outside of air conditioner management system 10. Apparatus base model 16 will be described in detail later.

SW generation unit 18 associates apparatus data 14 with apparatus base model 16 on the basis of acquired apparatus data 14, thereby generating software for managing a target apparatus corresponding to apparatus data 14 in air conditioner management system 10. SW generation unit 18 generates the software for each piece of acquired apparatus data 14.

For example, when apparatus data 14 of apparatus 30 (apparatus A) is acquired, SW generation unit 18 associates apparatus data 14 with apparatus base model 16 on the basis of acquired apparatus data 14, thereby generating apparatus control SW 20 (hereinafter referred to as "SW 20 for apparatus A") for monitoring, operating, or controlling apparatus 30 in air conditioner management system 10. In addition, when apparatus data 14 of apparatus 32 (apparatus B) is acquired, SW generation unit 18 associates apparatus data 14 with apparatus base model 16 on the basis of acquired apparatus data 14, thereby generating apparatus control SW 22 (hereinafter referred to as "SW 22 for apparatus B") for monitoring, operating, or controlling apparatus 32 in air conditioner management system 10.

Air conditioner management system 10 communicates with apparatus 30 by generated SW 20 for apparatus A. SW 20 for apparatus A defines a data type and a communication scheme for each item of apparatus data 14 of apparatus 30, acquires control data (temperature, ON/OFF, air volume, suction temperature, etc.) from apparatus 30 in accordance with the defined communication scheme, and stores the acquired control data in a storage device (not illustrated) in accordance with the defined data type. In addition, when the setting of apparatus 30 is changed by a user in GUI processing unit 28, SW 20 for apparatus A transmits the changed set value to apparatus 30 according to a prescribed communication scheme.

Similarly, air conditioner management system 10 communicates with apparatus 32 using SW 22 for apparatus B. SW 22 for apparatus B defines a data type and a communication scheme for each item of apparatus data 14 of apparatus 32, acquires control data from apparatus 32 in accordance with the defined communication scheme, and stores the acquired control data in the storage device in accordance with the defined data type. In addition, when the setting of apparatus 32 is changed by the user in GUI processing unit 28, SW 22 for apparatus B transmits the changed set value to apparatus 32 according to a prescribed communication scheme.

Apparatus base model 16, SW generation unit 18, and SW 20 for apparatus A (SW 22 for apparatus B) will be described in detail later.

GUI processing unit 28 executes a process for displaying, via GUI, the control data of the apparatus 30 acquired by SW 20 for apparatus A and the control data of apparatus 32 acquired by SW 22 for apparatus B on a display unit (described later). When SW 20 for apparatus A is generated by SW generation unit 18, GUI processing unit 28 selects and displays on the display unit a GUI component for each item of apparatus data 14 of apparatus 30, and displays the control data of apparatus 30 acquired by SW 20 for apparatus A together with the GUI component. In addition, when SW 22 for apparatus B is generated by SW generation unit 18, GUI processing unit 28 selects and displays on the display unit a GUI component for each item of apparatus data 14 of apparatus 32, and displays the control data of apparatus 32 acquired by SW 22 for apparatus B together with the GUI component. The configuration of GUI processing unit 28 will also be described in detail later.

Figure 2:
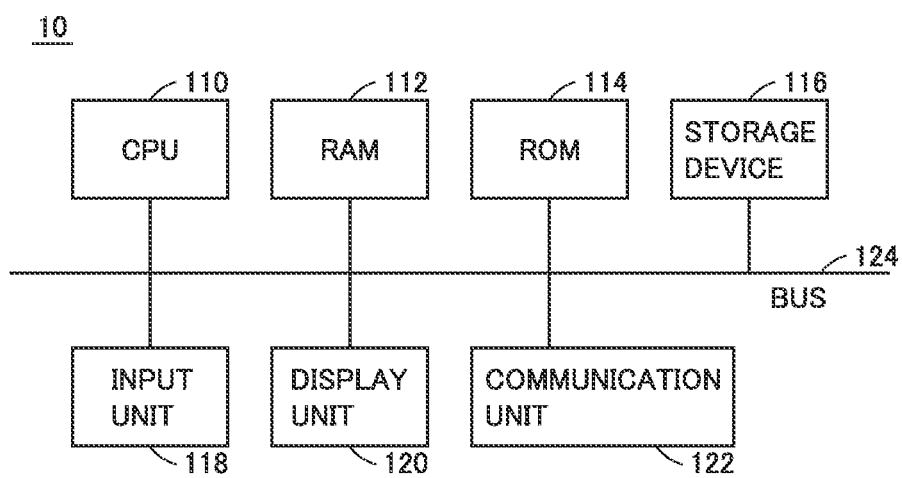
FIG. 2 is a block diagram illustrating an example of a hardware configuration of the air conditioner management system illustrated in FIG. 1.

FIG. 2 is a block diagram illustrating an example of a hardware configuration of air conditioner management system 10 illustrated in FIG. 1. Referring to FIG. 2, air conditioner management system 10 includes a central processing unit (CPU) 110, a random access memory (RAM) 112, a read only memory (ROM) 114, a storage device 116, an input unit 118, a display unit 120, and a communication unit 122. RAM 112, ROM 114, storage device 116, input unit 118, display unit 120, and communication unit 122 are connected to CPU 110 via a bus 124.

CPU 110 develops programs stored in ROM 114 in RAM 112 and executes the programs. The programs stored in ROM 114 have processing procedures of communication analysis unit 12, SW generation unit 18, and GUI processing unit 28 in FIG. 1. Air conditioner management system 10 executes processing for generating SW 20 for apparatus A and SW 22 for apparatus B by SW generation unit 18, processing for displaying the control data on display unit 120 by GUI processing unit 28, and the like according to these programs. In addition, CPU 110 develops SW 20 for apparatus A and SW 22 for apparatus B generated by SW generation unit 18 in RAM 112 and executes them.

Storage device 116 includes a nonvolatile memory such as a flash memory or a hard disk. Storage device 116 stores apparatus base model 16, apparatus data 14 acquired from the outside, and apparatus control SW (in this example, SW 20 for apparatus A and SW 22 for apparatus B) generated by SW generation unit 18. In addition, storage device 116 stores control data acquired from apparatuses 30 and 32 by SW 20 for apparatus A and SW 22 for apparatus B, respectively, GUI components used in GUI processing unit 28, display data generated by GUI processing unit 28, and the like.

Input unit 118 is a keyboard, a mouse, or the like that can be operated by the user. Display unit 120 is a display that displays display data generated by GUI processing unit 28 via GUI, and is composed of, for example, a liquid crystal display (LCD). Display unit 120 may be a touch panel display, and in that case, a touch panel may have a part of the input function of input unit 118.

Communication unit 122 is a communication interface for communicating with apparatuses 30 and 32. Specifically, apparatuses 30 and 32 are connected to air conditioner management system 10 through communication unit 122. In addition, an external memory (such as a USB memory or an SD card) can also be connected to communication unit 122. When apparatus data 14 is acquired from the external memory, the external memory is connected to air conditioner management system 10 through communication unit 122.

Figure 3:
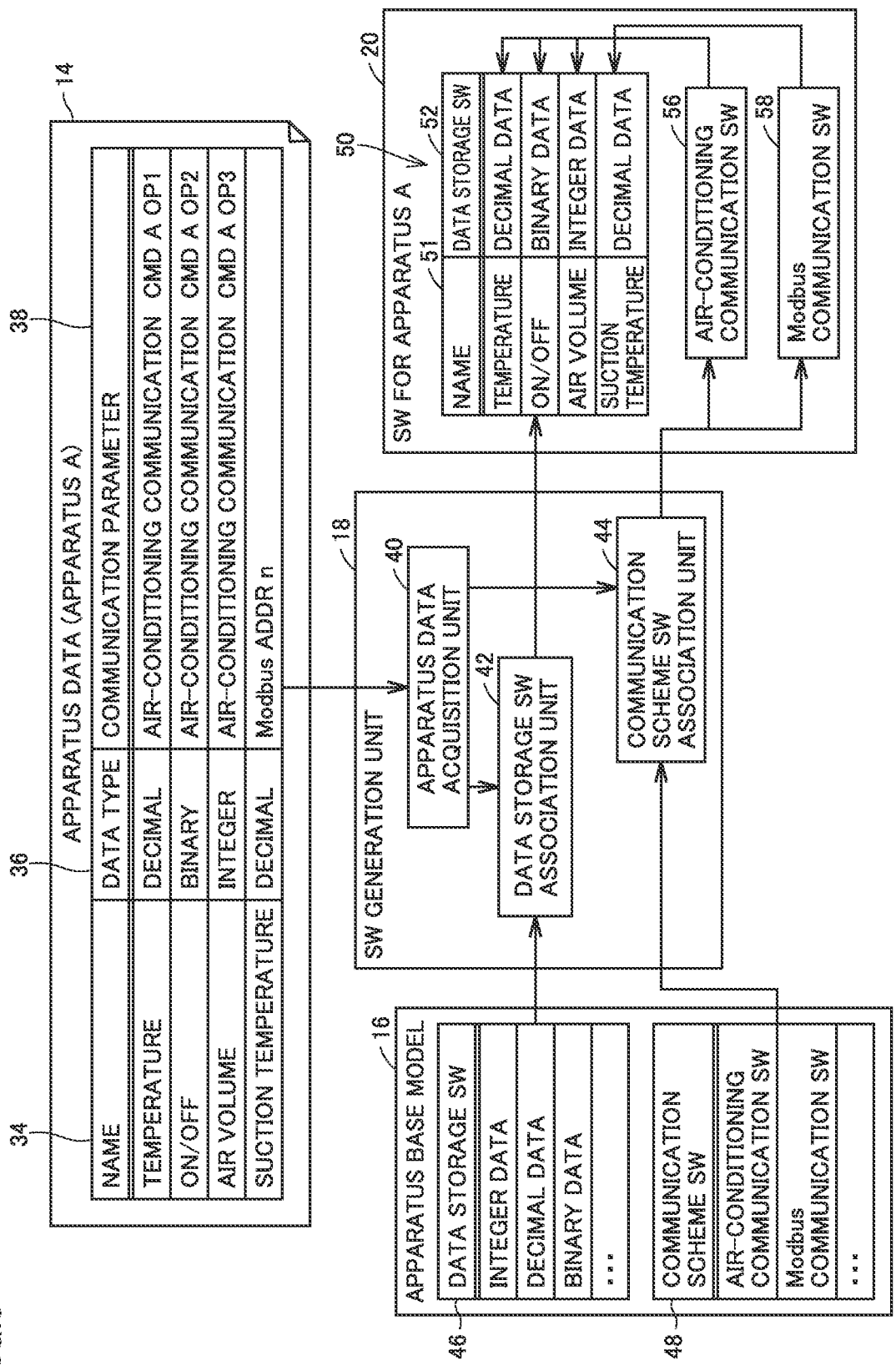
FIG. 3 is a detailed configuration diagram of an apparatus base model, an SW generation unit, and SW for apparatus A illustrated in FIG. 1.

FIG. 3 is a detailed configuration diagram of apparatus base model 16, SW generation unit 18, and SW 20 for apparatus A illustrated in FIG. 1. Note that the configuration of SW 22 for apparatus B is similar to that of SW 20 for apparatus A except for specific data items. Therefore, SW 20 for apparatus A will be representatively described below, and the description of SW 22 for apparatus B will be omitted.

Referring to FIG. 3, apparatus base model 16 includes data storage SW 46 and communication scheme SW 48. Data storage SW 46 is a model (first model) that provides a data type (integer, decimal, binary, etc.) of control data of an apparatus managed by air conditioner management system 10. Data storage SW 46 provides a "box" for storing control data according to a data type defined in apparatus data 14 for each item of apparatus data 14.

Communication scheme SW 48 is a model (second model) that provides a communication scheme for communicating the control data of the apparatus managed by air conditioner management system 10 with the outside of air conditioner management system 10. Communication scheme SW 48 provides communication SW for exchanging control data with a target apparatus in accordance with a communication parameter defined in apparatus data 14 for each item of apparatus data 14. In this example, communication scheme SW 48 can provide "air-conditioning communication SW" that provides communication SW following a prescribed air-conditioning communication protocol, "Modbus communication SW" that provides communication SW following a Modbus protocol, and the like.

SW generation unit 18 includes an apparatus data acquisition unit 40, a data storage SW association unit 42, and a communication scheme SW association unit 44. Apparatus data acquisition unit 40 acquires apparatus data 14 from communication analysis unit 12 (FIG. 1) or the external memory. Then, apparatus data acquisition unit 40 outputs, for each of items of acquired apparatus data 14, data of "name" and data of "data type" to data storage SW association unit 42 from acquired apparatus data 14 and outputs data of "name" and data of "communication parameter" to communication scheme SW association unit 44.

Data storage SW association unit 42 associates apparatus data 14 received from apparatus data acquisition unit 40 with data storage SW 46 of apparatus base model 16, thereby generating software for storing the control data acquired from the target apparatus. More specifically, when receiving data of "name" and data of "data type" for each item of apparatus data 14 of apparatus 30, data storage SW association unit 42 associates apparatus data 14 with data storage SW 46 on the basis of "data type" of apparatus data 14, thereby generating software for defining the name and the data type of the control data of apparatus 30 for each item of apparatus data 14 (first generation unit).

Communication scheme SW association unit 44 associates apparatus data 14 received from apparatus data acquisition unit 40 with communication scheme SW 48 of apparatus base model 16, thereby generating software for performing communication with the target apparatus. More specifically, when receiving data of "name" and data of "communication parameter" for each item of apparatus data 14 of apparatus 30, communication scheme SW association unit 44 associates apparatus data 14 with communication scheme SW 48 on the basis of the communication scheme defined by "communication parameter", thereby generating software for communicating the control data with apparatus 30 (second generation unit).

As a result, for apparatus 30, SW 20 for apparatus A is generated that acquires control data from apparatus 30 by communication SW in accordance with the communication scheme defined by the "communication parameter" for each item of apparatus data 14 and stores the acquired control data in storage device 116 (FIG. 2) by the "data storage SW" in the type defined by the "data type".

Generated SW 20 for apparatus A includes a data storage unit 50, an air-conditioning communication SW unit 56, and a Modbus communication SW unit 58. Data storage unit 50 stores, for each item of name 51, the control data acquired by air-conditioning communication SW unit 56 or Modbus communication SW unit 58 in storage device 116 by data storage SW 52 associated by data storage SW association unit 42.

Air-conditioning communication SW unit 56 acquires the control data from apparatus 30 by the air-conditioning communication SW in accordance with the communication parameter defined in apparatus data 14 for the item to which the air-conditioning communication SW is associated by communication scheme SW association unit 44 among the items of apparatus data 14.

Modbus communication SW unit 58 acquires the control data from apparatus 30 by the Modbus communication SW in accordance with the communication parameter defined in apparatus data 14 for the item to which the Modbus communication SW is associated by communication scheme SW association unit 44 among the items of apparatus data 14.

Figure 4:
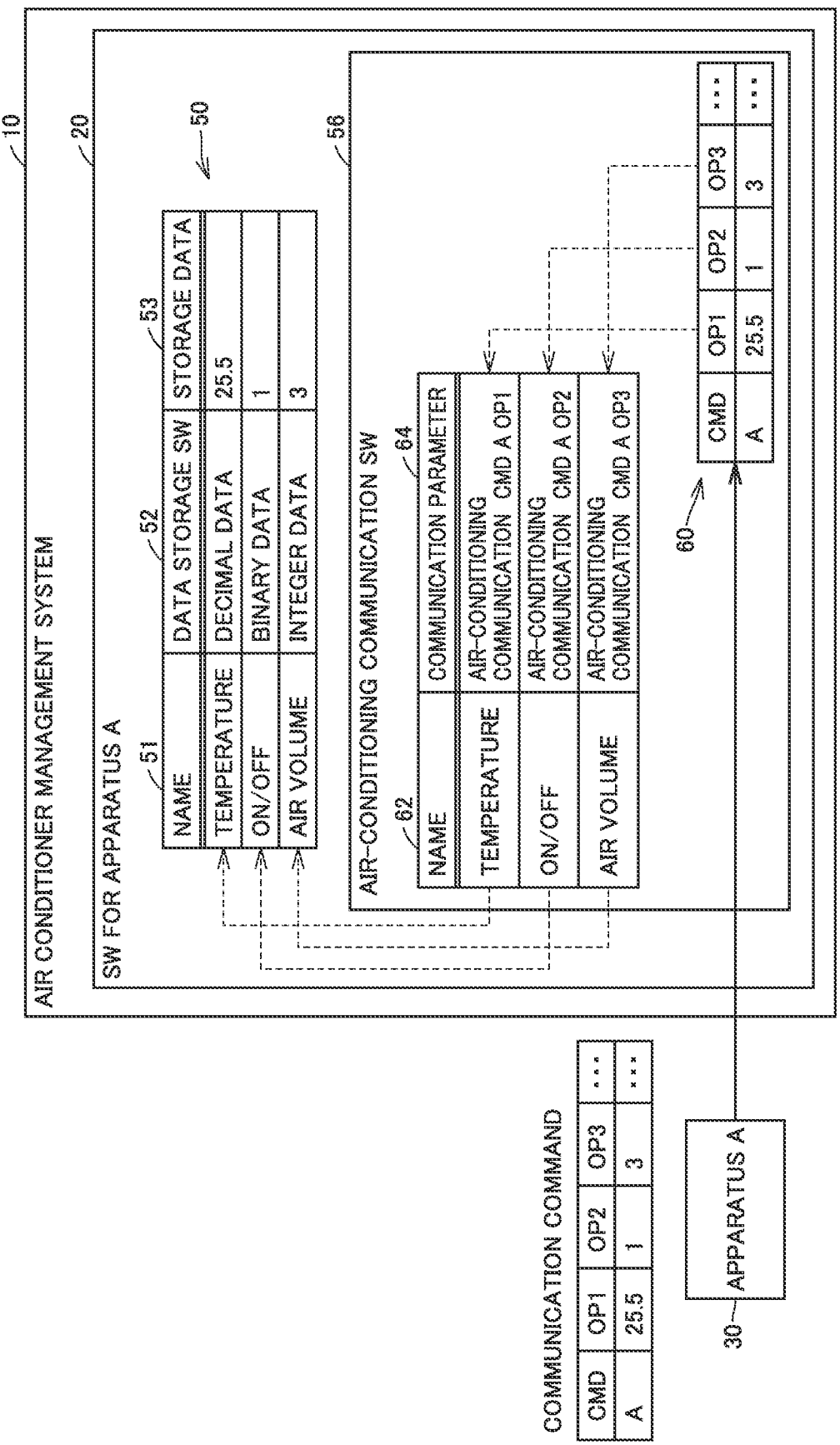
FIG. 4 is a diagram for describing an operation of the SW for apparatus A when control data is acquired from apparatus A by the SW for apparatus A generated by the SW generation unit.

FIG. 4 is a diagram for describing the operation of SW 20 for apparatus A when control data is acquired from apparatus 30 (apparatus A) by SW 20 for apparatus A generated by SW generation unit 18. FIG. 4 illustrates the operation of SW 20 for apparatus A when air-conditioning communication SW unit 56 acquires control data from apparatus 30.

Referring to FIG. 4, air-conditioning communication SW unit 56 of SW 20 for apparatus A acquires a communication command 60 from apparatus 30. Communication command 60 includes a command CMD for specifying communication with apparatus 30 and data for each operand defined in advance. Note that, in this example, an operand OP1 indicates a set value of "temperature" of apparatus 30, an operand OP2 indicates a state of "ON/OFF" of apparatus A, and an operand OP3 indicates a setting of "air volume" of apparatus A.

When acquiring communication command 60 from apparatus 30, air-conditioning communication SW unit 56 acquires control data from communication command 60 according to communication parameter 64 for each name 62. Specifically, air-conditioning communication SW unit 56 associates the data of operands OP1, OP2, and OP3 of communication command 60 with "temperature", "ON/OFF", and "air volume" in name 62, respectively.

Then, data storage unit 50 stores, for each name 51, the control data acquired by air-conditioning communication SW unit 56 in storage device 116 as storage data 53, using the "name" as a key, by storage SW defined in data storage SW 52.

Referring again to FIG. 1, air conditioner management system 10 further includes GUI processing unit 28 for displaying the control data of apparatus 30 acquired by SW 20 for apparatus A and the control data of apparatus 32 acquired by SW 22 for apparatus B on display unit 120 (FIG. 2). GUI processing unit 28 generates a GUI image for displaying control data acquired by SW 20 for apparatus A and SW 22 for apparatus B generated by SW generation unit 18 on display unit 120, and executes display control for displaying the generated GUI image on display unit 120 together with the control data.

Figure 5:
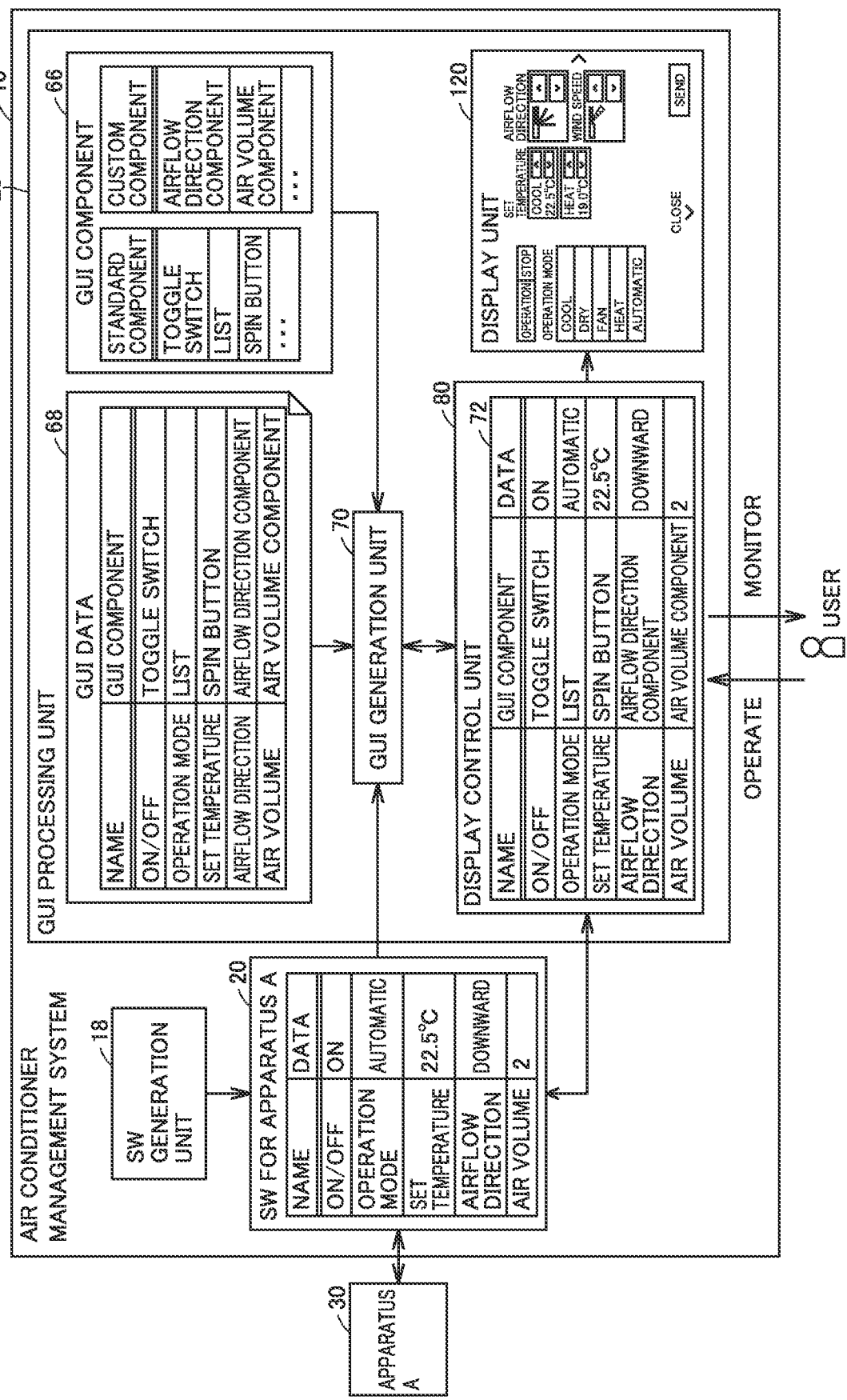
FIG. 5 is a diagram illustrating a configuration example of a GUI processing unit.

FIG. 5 is a diagram illustrating a configuration example of GUI processing unit 28. Note that FIG. 5 representatively illustrates a configuration for displaying each control data acquired by SW 20 for apparatus A on display unit 120.

Referring to FIG. 5, GUI processing unit 28 includes a GUI generation unit 70 and a display control unit 80. GUI generation unit 70 generates display data for displaying, via GUI, each control data acquired by SW 20 for apparatus A on display unit 120 on the basis of each control data acquired from apparatus 30 by SW 20 for apparatus A, a GUI component database (DB) 66, and GUI data 68.

GUI component DB 66 is a database of various GUI components displayable on display unit 120, and includes, for example, GUI components such as "toggle switch", "list", and "spin button" as standard components, and GUI components such as "airflow direction component" and "air volume component" as custom components.

GUI data 68 is a map for defining association between each control data acquired from apparatus 30 by SW 20 for apparatus A and a GUI component in GUI component DB 66. In this example, GUI data 68 defines that control data of "ON/OFF", "operation mode", "set temperature", "airflow direction", and "air volume" are displayed together with GUI components of "toggle switch", "list", "spin button", "airflow direction component", and "air volume component", respectively.

GUI component DB 66 and GUI data 68 are prepared in advance and stored in storage device 116 (FIG. 2). Note that the GUI components in GUI component DB 66 can be added and changed as appropriate, and GUI data 68 can also be changed as appropriate using input unit 118 (FIG. 2).

Then, GUI generation unit 70 generates, for each control data acquired by SW 20 for apparatus A, display data 72 for displaying the GUI component and the control data on display unit 120 on the basis of GUI data 68.

Display control unit 80 executes display control for displaying display data 72 generated by GUI generation unit 70 on display unit 120. Specifically, for each display item of display data 72, display control unit 80 acquires the corresponding GUI component from GUI component DB 66, displays the same on display unit 120, reads the control data acquired by SW 20 for apparatus A from storage device 116, and displays the acquired control data together with the corresponding GUI component.

Figure 6:
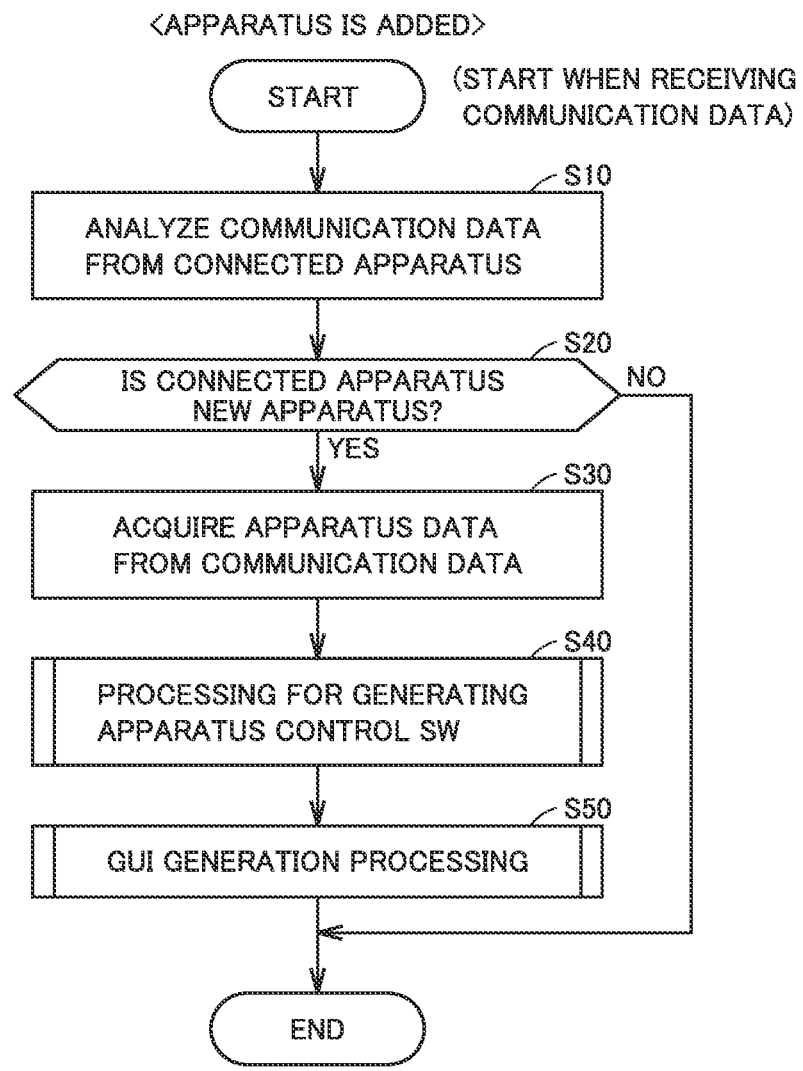
FIG. 6 is a flowchart illustrating an example of a procedure of processing executed by the air conditioner management system when an apparatus is connected to the air conditioner management system.
Figure 7:
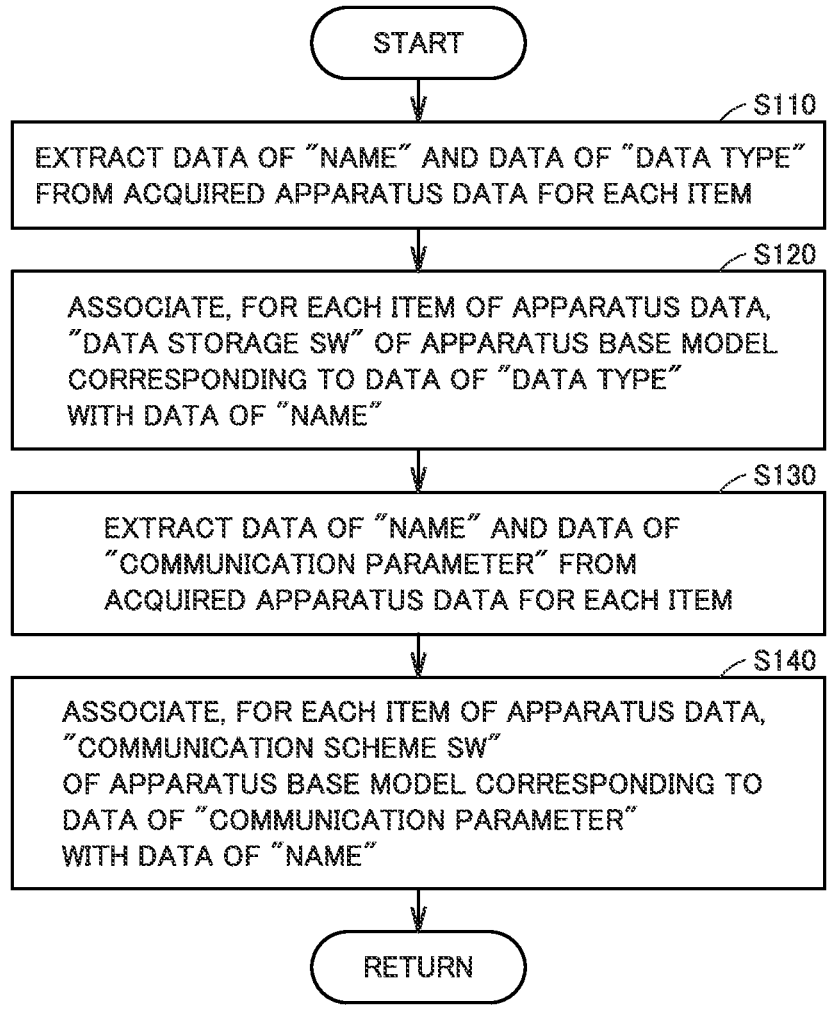
FIG. 7 is a flowchart illustrating an example of a procedure of processing for generating apparatus control SW executed in step S40 of FIG. 6.
Figure 8:
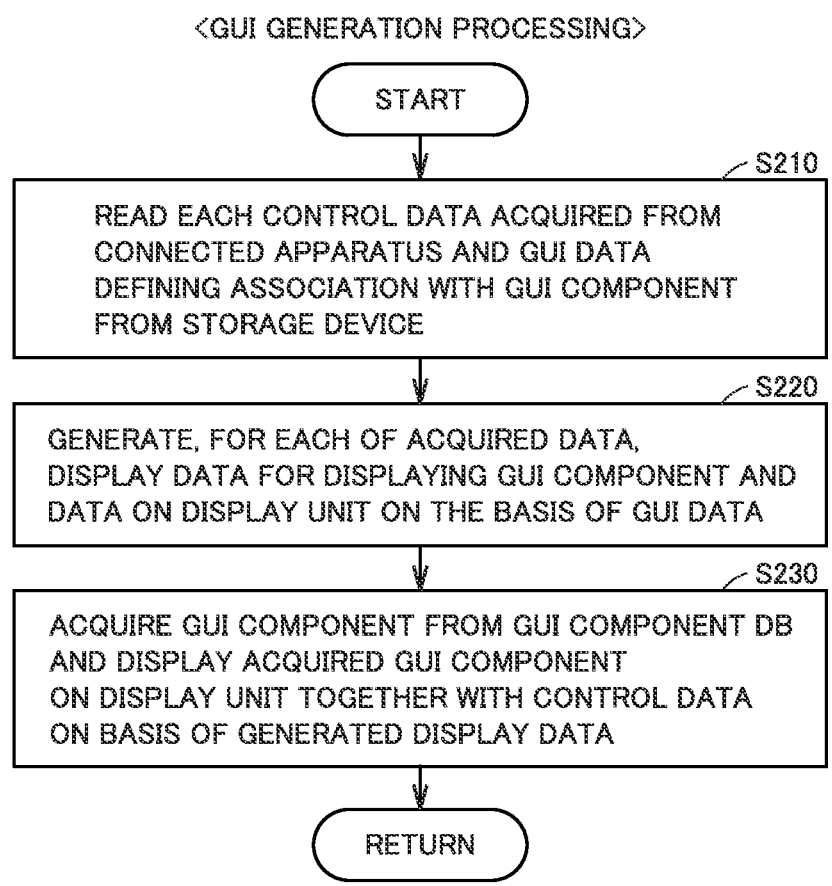
FIG. 8 is a flowchart illustrating an example of a procedure of GUI generation processing executed in step S50 of FIG. 6.

FIGS. 6 to 8 are flowcharts illustrating an example of a procedure of processing executed by air conditioner management system 10 when an apparatus is connected to air conditioner management system 10. A series of processes shown in the flowcharts is started, when, for example, air conditioner management system 10 receives communication data including apparatus data 14 of the apparatus.

Referring to FIG. 6, when receiving the communication data from the apparatus connected to air conditioner management system 10, air conditioner management system 10 analyzes the received communication data (step S10). Then, communication analysis unit 12 determines whether or not the connected apparatus is a new apparatus (step S20). When there is no apparatus control SW corresponding to the apparatus, communication analysis unit 12 determines that the apparatus is a newly connected apparatus. When it is determined that the apparatus is not a new apparatus (NO in step S20), a series of subsequent processes is not executed and the processing proceeds to an end.

When it is determined in step S20 that the apparatus is a newly connected apparatus (YES in step S20), communication analysis unit 12 acquires apparatus data 14 of the apparatus from the acquired communication data (step S30).

Note that, as described above, apparatus data 14 can also be acquired from the external memory. In a case where apparatus data 14 is acquired from the external memory, the processing proceeds from step S10 to step S40 without executing step S30.

When apparatus data 14 is acquired from the communication data or the external memory, air conditioner management system 10 executes processing for generating apparatus control SW for the apparatus by SW generation unit 18 (step S40). The processing for generating the apparatus control SW will be described in detail later.

Then, when the apparatus control SW for the apparatus is generated by SW generation unit 18, air conditioner management system 10 executes GUI generation processing for generating display data for displaying, via GUI, the control data of the apparatus on display unit 120 by GUI processing unit 28 (step S50). The GUI generation processing will also be described in detail later.

FIG. 7 is a flowchart illustrating an example of a procedure of the processing for generating apparatus control SW executed in step S40 of FIG. 6. Referring to FIG. 7, SW generation unit 18 extracts data of "name" and data of "data type" for each item from apparatus data 14 acquired in step S30 (FIG. 6) (step S110).

Next, SW generation unit 18 associates the "data storage SW" of apparatus base model 16 corresponding to the data of "data type" (decimal, binary, integer, etc.) with the data of "name" for each item of apparatus data 14 (step S120). As a result, data storage unit 50 (FIG. 3) of the apparatus control SW is generated.

Further, SW generation unit 18 extracts data of "name" and data of "communication parameter" for each item from apparatus data 14 acquired in step S30 (FIG. 6) (step S130).

Then, SW generation unit 18 associates the "communication scheme SW" of apparatus base model 16 corresponding to the data of "communication parameter" with the data of "name" for each item of apparatus data 14 (step S140). As a result, communication SW of air-conditioning communication SW unit 56, Modbus communication SW unit 58, or the like (FIG. 3) of the apparatus control SW is generated.

In this manner, SW generation unit 18 automatically generates the apparatus control SW for the apparatus connected to air conditioner management system 10. The processing for acquiring the control data from the apparatus by the generated apparatus control SW will be described later with reference to FIG. 9.

FIG. 8 is a flowchart illustrating an example of a procedure of the GUI generation processing executed in step S50 of FIG. 6. Referring to FIG. 5 together with FIG. 8, GUI processing unit 28 reads, from storage device 116, GUI data 68 defining association between each control data acquired by the apparatus control SW from the apparatus connected to air conditioner management system 10 and a GUI component (step S210).

Then, GUI processing unit 28 generates, for each control data acquired from the apparatus, display data 72 for displaying the GUI component and the control data on display unit 120 by GUI generation unit 70 on the basis of GUI data 68 (step S220).

Then, using display control unit 80, GUI processing unit 28 acquires the GUI component from GUI component DB 66 on the basis of generated display data 72 and displays the GUI component on display unit 120 together with the control data acquired from the apparatus by the apparatus control SW (step S230).

As described above, when an apparatus is newly connected to air conditioner management system 10, air conditioner management system 10 generates apparatus control SW for the newly connected apparatus, and further, generates GUI for displaying control data acquired by the apparatus control SW on display unit 120 and displays the generated GUI on display unit 120.

Figure 9:
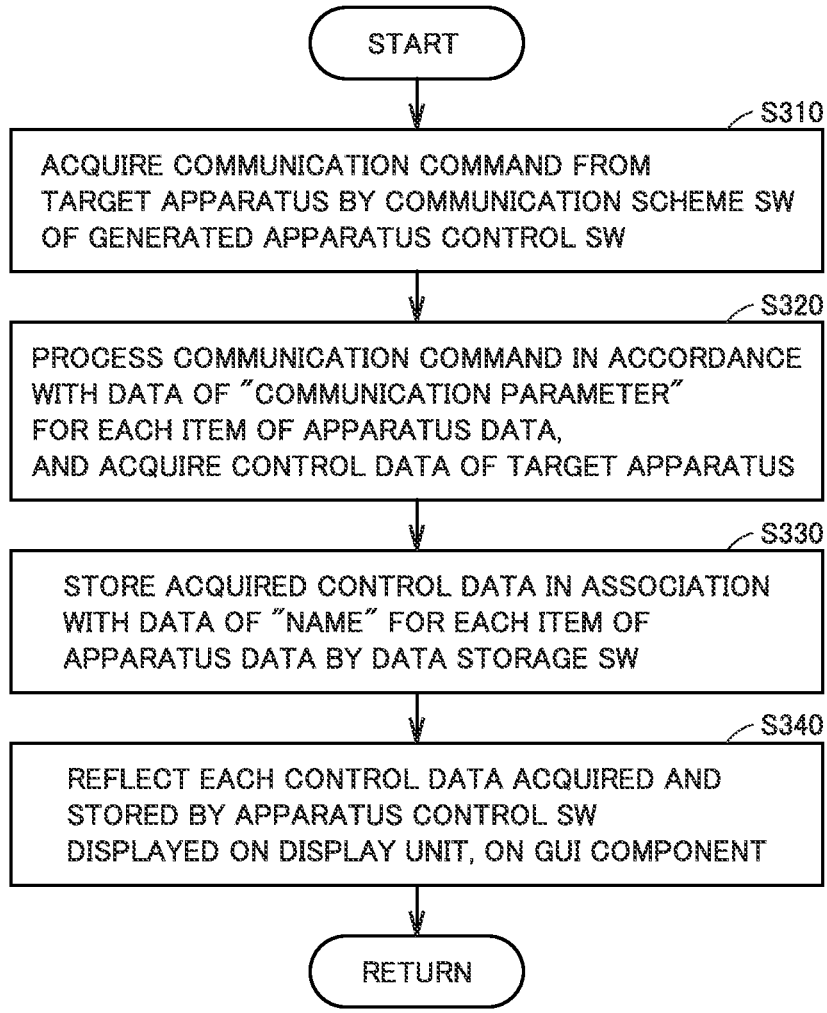
FIG. 9 is a flowchart illustrating an example of a procedure of processing for acquiring control data from the apparatus connected to the air conditioner management system.

FIG. 9 is a flowchart illustrating an example of a procedure of the processing for acquiring control data from the apparatus connected to air conditioner management system 10. A series of processes shown in this flowchart is repeatedly executed at predetermined intervals while air conditioner management system 10 and the connected apparatus are activated.

Referring to FIG. 4 together with FIG. 9, the apparatus control SW (SW 20 for apparatus A, SW 22 for apparatus B, and the like) generated by SW generation unit 18 acquires communication command 60 from the target apparatus (apparatuses 30, 32, and the like) by the communication scheme SW (air-conditioning communication SW 56, Modbus communication SW 58, and the like) (step S310).

Next, the apparatus control SW processes communication command 60 according to the data of "communication parameter" for each item of apparatus data 14 and acquires the control data of the target apparatus (step S320).

Subsequently, for each item of apparatus data 14, the apparatus control SW stores the acquired control data in storage device 116 in a type of "data type" in association with the data of "name" by the "data storage SW" (step S330).

In addition, GUI processing unit 28 displays, by display control unit 80, each control data acquired and stored by the apparatus control SW together with the GUI component displayed on display unit 120 (step S340).

As a result, the control data is acquired from the target apparatus by the apparatus control SW generated by SW generation unit 18, and is displayed on display unit 120 by the corresponding GUI component.

In air conditioner management system 10, the user can monitor the control data of each apparatus connected to air conditioner management system 10 on display unit 120, and can also operate each item using the GUI component displayed on display unit 120. That is, for example, when the state of apparatus 30 is displayed on display unit 120, the temperature of apparatus 30 can be set via display unit 120 by operating the spin button for the set temperature of apparatus 30. The set data is transmitted to apparatus 30 by SW 20 for apparatus A in accordance with the communication scheme defined in the communication parameter.

Figure 10:
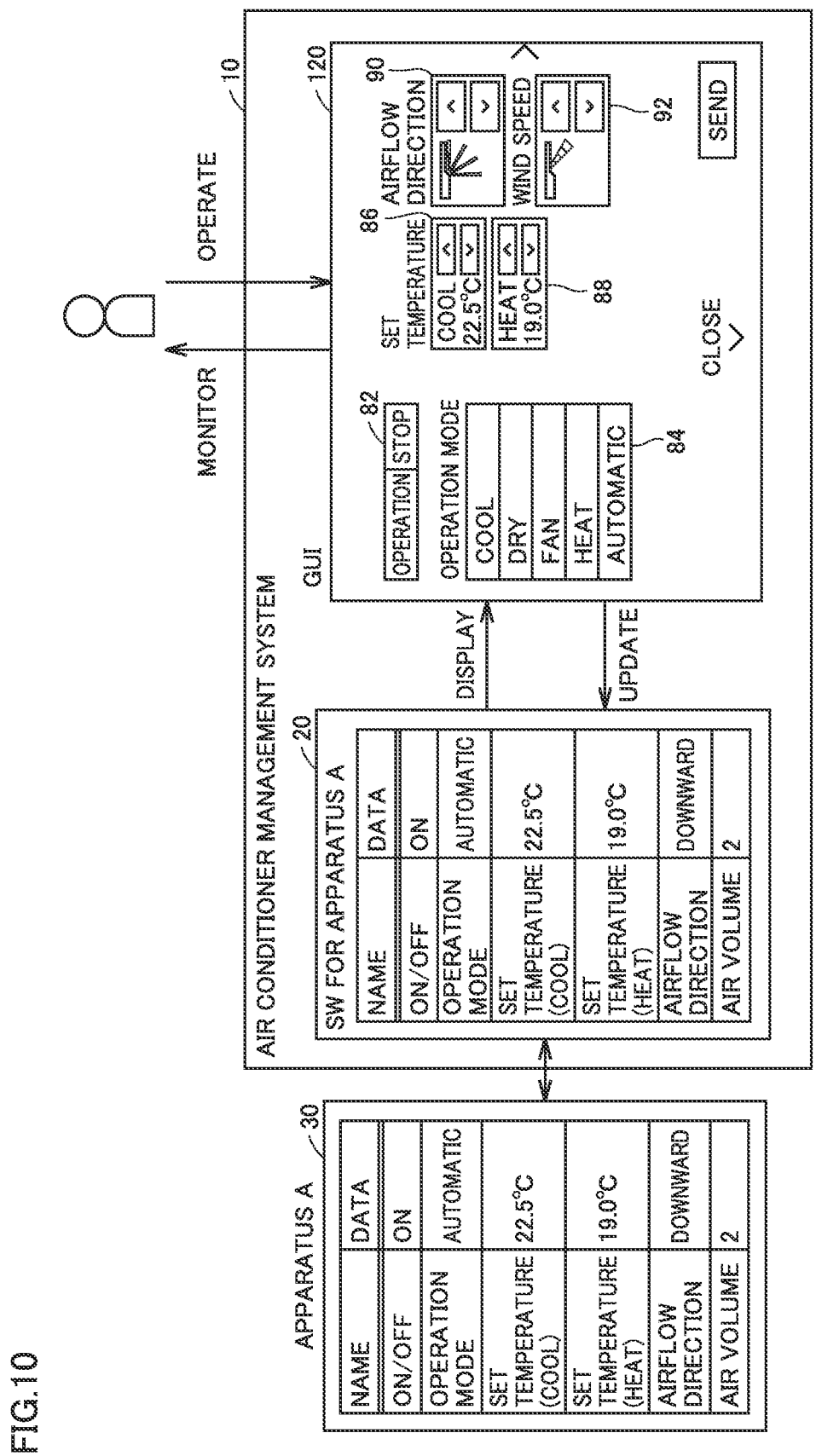
FIG. 10 is a diagram illustrating a display example of control data on a display unit.

FIG. 10 is a diagram illustrating a display example of control data on display unit 120. Note that FIG. 10 representatively illustrates a display example of control data of apparatus 30 (apparatus A). Referring to FIG. 10, GUI components 82 to 92 are displayed on display unit 120 by GUI processing unit 28.

For example, GUI component 82 is a toggle switch, and the display of "operation"/"stop" is switched according to the control data of "ON/OFF" of "name" indicating the operation state (operation/stop) of apparatus 30 acquired by SW 20 for apparatus A. In addition, when either "operation" or "stop" of GUI component 82 is selected and a "send" button is pressed, the set data of "ON/OFF" is transmitted to apparatus 30 by SW 20 for apparatus A, and the operation state of apparatus 30 is switched.

Alternatively, for example, GUI component 86 is a spin button, and the control data of the "set temperature (cool)" indicating the set temperature of apparatus 30 for cooling acquired by SW 20 for apparatus A is displayed on GUI component 86. In addition, when the set temperature is changed by the spin button of GUI component 86 and the "send" button is pressed, the set data of the "set temperature (cool)" is transmitted to apparatus 30 by SW 20 for apparatus A, and the set temperature of apparatus 30 for cooling is changed.

Note that, in the above description, it is assumed that an apparatus of a new model is connected to air conditioner management system 10, and in a case where an apparatus for which the apparatus control SW is once generated is connected again (for example, replacement of the same model or the like), the apparatus control SW which has been generated is used. On the other hand, when, during connection of an apparatus, apparatus control SW for the apparatus is already present, but the parameter of the apparatus is changed, the apparatus control SW is regenerated. That is, when there is a change in the parameter of the apparatus and apparatus data 14 is different from the previous one, the apparatus control SW is regenerated by SW generation unit 18, and the display data for displaying the control data on display unit 120 is also regenerated. For example, suppose that the apparatus is an air conditioner and the upper limit value of the set temperature is defined in apparatus data 14. In that case, when a new model in which the upper limit value of the set temperature is changed is connected, the apparatus control SW and the display data of display unit 120 are regenerated.

Figure 11:
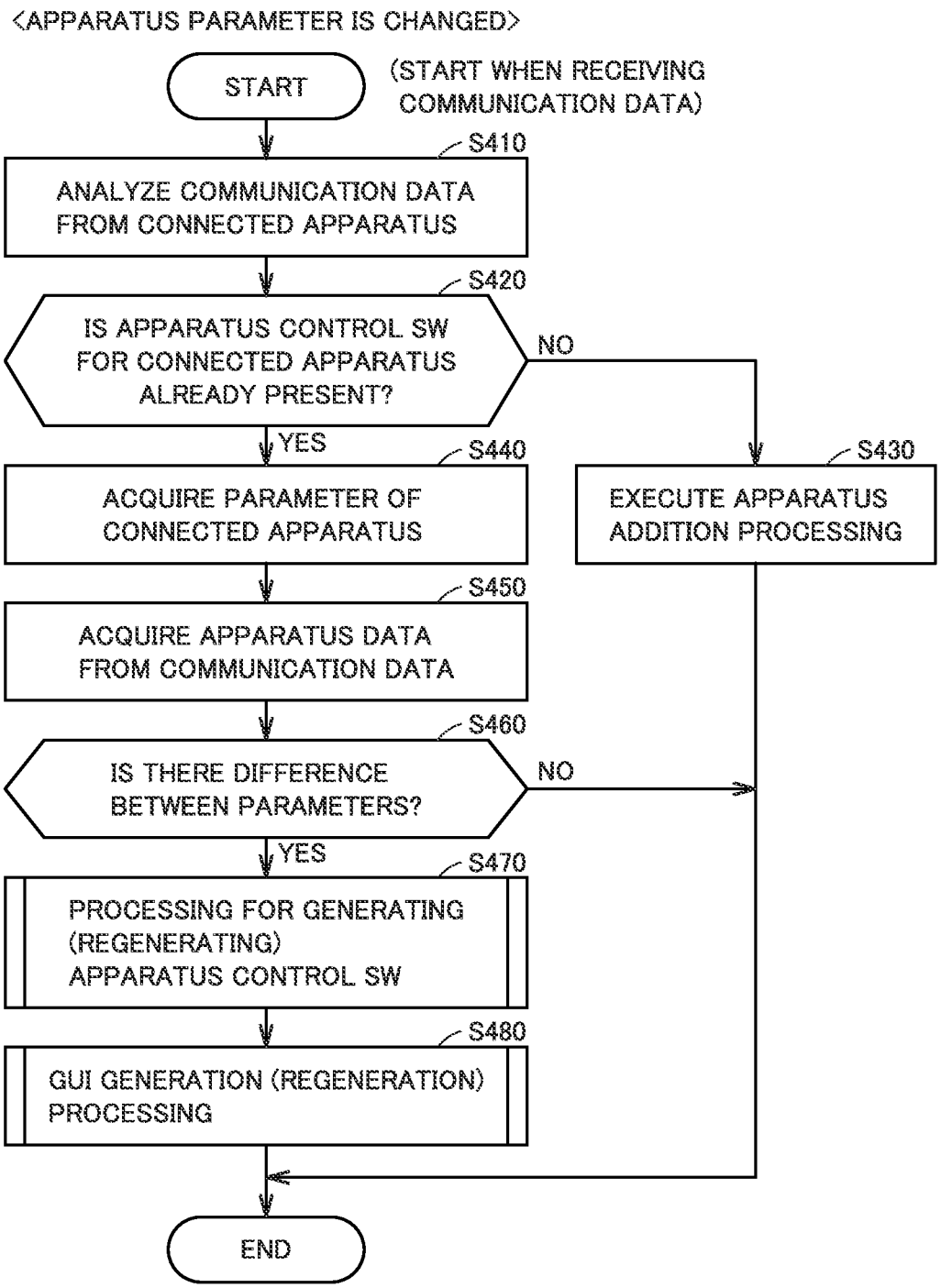
FIG. 11 is a flowchart illustrating an example of a procedure of processing executed by the air conditioner management system when an apparatus parameter is changed.

FIG. 11 is a flowchart illustrating an example of a procedure of processing executed by air conditioner management system 10 when the apparatus parameter is changed. A series of processes shown in this flowchart is also started, when, for example, air conditioner management system 10 receives communication data including apparatus data 14 of the connected apparatus.

Referring to FIG. 11, when receiving the communication data from the apparatus connected to air conditioner management system 10, air conditioner management system 10 analyzes the received communication data (step S410). Then, communication analysis unit 12 determines whether or not apparatus control SW for the connected apparatus has already been generated (step S420). When it is determined that there is no apparatus control SW for the apparatus (NO in step S420), apparatus addition processing described with reference to FIGS. 6 to 8 is executed (step S430).

When it is determined in step S420 that the apparatus control SW for the apparatus has already been generated (YES in step S420), the parameter of the apparatus is acquired from the apparatus control SW (step S440).

Next, communication analysis unit 12 acquires apparatus data 14 of the apparatus from the communication data acquired in step S410 (step S450). Then, communication analysis unit 12 compares the parameter acquired from the existing apparatus control SW in step S440 with the parameter defined in apparatus data 14 acquired in step S450, and determines whether or not there is a difference between them (step S460).

If there is a difference between the compared parameters (YES in step S460), air conditioner management system 10 executes processing for generating (regenerating) the apparatus control SW by SW generation unit 18 on the basis of apparatus data 14 acquired in step S450 (step S470). The processing executed in step S470 is the same as the processing described in FIG. 7.

Then, when the apparatus control SW is generated by SW generation unit 18, air conditioner management system 10 executes GUI generation processing for regenerating display data for displaying the control data of the apparatus on display unit 120 by GUI processing unit 28 (step S480). The processing executed in step S480 is the same as the processing described in FIG. 8.

Note that, when there is no difference between the compared parameters in step S460 (NO in step S460), the existing apparatus control SW and display data of display unit 120 can be used, and thus the processing proceeds to the end without executing steps S470 and S480.

As described above, in air conditioner management system 10 according to the present embodiment, apparatus base model 16 is prepared, and the apparatus control SW (SW 20 for apparatus A, SW 22 for apparatus B, and the like) for managing the apparatus is automatically generated in air conditioner management system 10 by associating apparatus data 14 with apparatus base model 16 on the basis of apparatus data 14. Therefore, according to air conditioner management system 10, it is not necessary to send a worker to the site and install software of air conditioner management system 10 every time an apparatus is added or changed. As a result, it is possible to flexibly and easily handle addition or change of an apparatus.

In addition, in the present embodiment, when apparatus data 14 is received from the apparatus connected to air conditioner management system 10 or the external memory, the apparatus control SW for the apparatus is generated by SW generation unit 18. Therefore, according to the present embodiment, it is not necessary to, for example, prepare many pieces of apparatus control SW for various kinds of apparatuses in consideration of apparatuses that can be connected to air conditioner management system 10, and the apparatus control SW can be generated in a timely manner.

In addition, in the present embodiment, when multiple apparatuses (apparatuses 30, 32, and the like) are connected to air conditioner management system 10, the apparatus control SW is generated for each apparatus (SW 20 for apparatus A, SW 22 for apparatus B, and the like). Therefore, according to the present embodiment, the generation amount of SW can be suppressed to the minimum necessary.

In addition, according to the present embodiment, GUI generation unit 70 is also provided together with SW generation unit 18, whereby the apparatus control SW can be automatically generated by SW generation unit 18, and the GUI for displaying the control data acquired by the apparatus control SW on display unit 120 can also be automatically generated by GUI generation unit 70.

Although in the above description, the control data communicated with air conditioner management system 10 by the apparatus control SW is monitored or operated on display unit 120 of air conditioner management system 10, the control data may be monitored or operated on the Web in a remote server, PC, smartphone, or the like by further communicating with such devices.

It should be considered that the embodiment disclosed herein is an example in all respects and is not restrictive. The scope of the present invention is defined not by the above description of the embodiment but by the claims, and is intended to include meanings equivalent to the claims and all modifications within the scope.

REFERENCE SIGNS LIST

10: air conditioner management system
12: communication analysis unit
14: apparatus data
16: apparatus base model
18: SW generation unit
20: SW for apparatus A
22: SW for apparatus B
28: GUI processing unit
30, 32: apparatus
40: apparatus data acquisition unit
42: data storage SW association unit
44: communication scheme SW association unit
50: data storage unit
56: air-conditioning communication SW unit
58: Modbus communication SW unit
60: communication command
66: GUI component DB
68: GUI data
70: GUI generation unit
72: display data
80: display control unit
82 to 92: GUI component
110: CPU
112: RAM
114: ROM
116: storage device
118: input unit
120: display unit
122: communication unit
124: bus

The invention claimed is:

1. An apparatus management device to remotely manage at least one apparatus, the apparatus management device comprising:
a storage device to store an apparatus base model for defining the apparatus in the apparatus management device from apparatus data including information regarding each item managed for the apparatus; and
an SW generation unit to generate software for managing the apparatus by the apparatus management device by associating the apparatus data with the apparatus base model on the basis of the apparatus data, wherein
the apparatus base model includes:
a first model to define a data type of control data managed by the apparatus management device; and
a second model to define a communication scheme of the control data with an outside, and
the SW generation unit includes:
an apparatus data acquisition unit to acquire the apparatus data from outside the apparatus management device;
a first generation unit to generate software for defining a name and a data type of control data of the apparatus for each item of the apparatus data by associating the apparatus data with the first model on the basis of the apparatus data which has been acquired; and
a second generation unit to generate software for performing communication of the control data with the apparatus by associating the apparatus data with the second model on the basis of the apparatus data which has been acquired.

2. The apparatus management device according to claim 1, wherein
the SW generation unit generates software for managing the apparatus when receiving the apparatus data from outside the apparatus management device.

3. The apparatus management device according to claim 1, wherein,
when there are a plurality of apparatuses managed by the apparatus management device, the SW generation unit generates software for managing the apparatuses for each of the apparatuses.

4. The apparatus management device according to claim 1, further comprising:
a display unit to display control data acquired from the apparatus by using software generated by the SW generation unit; and
a GUI generation unit to generate display data for displaying the control data on the display unit via GUI.

5. The apparatus management device according to claim 4, wherein
the storage device includes:
a database of a GUI component used to display the control data on the display unit; and
GUI data to define the GUI component for each item of the apparatus data, and the GUI generation unit generates, for each item of the apparatus data, the display data for displaying a GUI component corresponding to control data acquired from the apparatus and the control data on the display unit in accordance with the GUI data.

6. The apparatus management device according to claim 1, wherein
the at least one apparatus includes an air conditioner.

7. A software generation method for automatically generating, in an apparatus management device that remotely manages at least one apparatus, software for managing the apparatus, the software generation method comprising:
acquiring, by the apparatus management device, apparatus data including information regarding each item managed for the apparatus; and
generating, in the apparatus management device, the software by associating the apparatus data with an apparatus base model on the basis of the apparatus data, wherein
the apparatus base model is a model for defining the apparatus in the apparatus management device from the apparatus data, the apparatus base model includes:
- a first model to define a data type of control data managed by the apparatus management device; and
- a second model to define a communication scheme of the control data to an outside, and the generating software further includes:
- generating software for defining a name and a data type of control data of the apparatus for each item of the apparatus data by associating the apparatus data with the first model on the basis of the apparatus data; and
- generating software for performing communication of the control data with the apparatus by associating the apparatus data with the second model on the basis of the apparatus data.

8. The software generation method according to claim 7, further comprising:
- generating display data for displaying control data acquired from the apparatus using software generated by the generating software on a display unit of the apparatus management device via GUI; and
- displaying the control data on the display unit via the GUI on the basis of the display data.

9. The software generation method according to claim 8, further comprising
- acquiring GUI data defining a GUI component used for display of the control data on the display unit for each item of the apparatus data, wherein
- the generating display data further includes generating, for each item of the apparatus data, the display data for displaying a GUI component corresponding to the control data and the control data on the display unit in accordance with the GUI data.

* * * * *